United States Patent
Sato et al.

(10) Patent No.: US 6,445,725 B1
(45) Date of Patent: *Sep. 3, 2002

(54) SPREAD SPECTRUM COMMUNICATION APPARATUS

(75) Inventors: Isamu Sato, Yokohama; Mitsuhiko Sato, Kawasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,472

(22) Filed: Jul. 24, 1997

Related U.S. Application Data

(63) Continuation of application No. 08/546,899, filed on Oct. 23, 1995, now abandoned, which is a continuation of application No. 08/298,055, filed on Aug. 30, 1994.

(30) Foreign Application Priority Data

Sep. 3, 1993 (JP) .............................. 5-219726
Sep. 21, 1993 (JP) ............................. 5-234694

(51) Int. Cl.[7] ............................................. H04B 7/02
(52) U.S. Cl. ..................... 375/130; 370/327; 370/437; 348/32; 348/33
(58) Field of Search ................. 375/200, 205, 375/260, 319; 370/320, 329, 336, 465, 468, 437, 335, 441, 479; 348/23, 41

(56) References Cited

U.S. PATENT DOCUMENTS

| 4,752,939 A | * | 6/1988 | Amoroso et al. ........... 375/200 |
| 4,907,087 A | * | 3/1990 | Schreiber .................... 358/186 |
| 4,930,140 A | * | 5/1990 | Cripps et al. ................ 375/200 |
| 5,101,406 A | * | 3/1992 | Messenger .................. 370/94.1 |

(List continued on next page.)

OTHER PUBLICATIONS

Keiser, Bernhard E., "Broadband Coding, Modulation, and Transmission Engineering", 1989, pp. 136–140.*

*Primary Examiner*—William Trost
*Assistant Examiner*—Congvan Tran
(74) *Attorney, Agent, or Firm*—Morgan & Finnegan, LLP

(57) ABSTRACT

A spread spectrum communication apparatus for communicating through a plurality of communication channels corresponding to a plurality of diffusion codes comprises a selector to select the number of communication channels which are used in accordance with a communication partner, and a communication unit to communicate with the communication partner through the communication channels of the number selected by the selector. The communication unit has a division unit to divide transmission data in accordance with the number of communication channels selected. The selector selects the number of communication channels in accordance with whether the communication partner is a color terminal or a black and white terminal, or in accordance with a processing speed of the communication partner, or in accordance with whether the communication partner processes binary image data or processes multivalue image data.

36 Claims, 16 Drawing Sheets

U.S. PATENT DOCUMENTS

| | | | | |
|---|---|---|---|---|
| 5,127,021 A | * | 6/1992 | Schreiber | 375/200 |
| 5,140,694 A | * | 8/1992 | Benden | 455/12 |
| 5,144,466 A | | 9/1992 | Nakamura et al. | 359/123 |
| 5,210,752 A | * | 5/1993 | Ito et al. | 370/337 |
| 5,220,417 A | * | 6/1993 | Sugiura | 358/468 |
| 5,222,247 A | * | 6/1993 | Breeden | 455/26.1 |
| 5,235,413 A | * | 8/1993 | Knierim | 358/37 |
| 5,257,257 A | * | 10/1993 | Chen et al. | 370/18 |
| 5,283,820 A | | 2/1994 | Ishiwatari et al. | 379/100 |
| 5,301,028 A | * | 4/1994 | Banker et al. | 348/570 |
| 5,305,348 A | * | 4/1994 | Izumi | 375/200 |
| 5,317,593 A | * | 5/1994 | Fulghum et al. | 375/1 |
| 5,345,469 A | * | 9/1994 | Fulghum | 375/1 |
| 5,373,502 A | * | 12/1994 | Turban | 370/441 |
| 5,392,133 A | * | 2/1995 | Nakajima | 358/468 |
| 5,467,367 A | * | 11/1995 | Izumi et al. | 375/206 |
| 5,509,085 A | * | 4/1996 | Kakutani | 382/167 |
| 5,555,294 A | * | 9/1996 | Abe | 379/100.17 |
| 5,600,672 A | * | 2/1997 | Oshima et al. | 375/219 |
| 5,692,130 A | * | 11/1997 | Shobu et al. | 395/200.2 |
| 5,696,598 A | * | 12/1997 | Yoshida et al. | 358/434 |
| 5,757,854 A | * | 5/1998 | Hunsinger | 375/260 |
| 5,784,065 A | * | 7/1998 | Kakutani | 345/431 |
| 6,064,437 A | * | 5/2000 | Phan et al. | 348/446 |

* cited by examiner

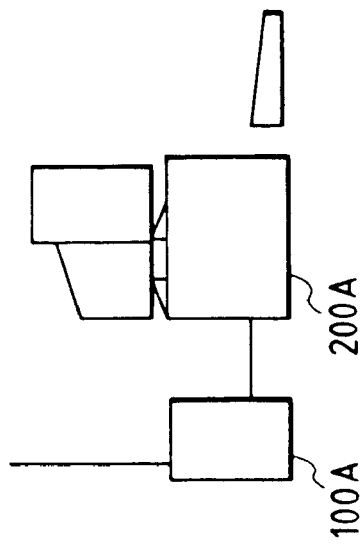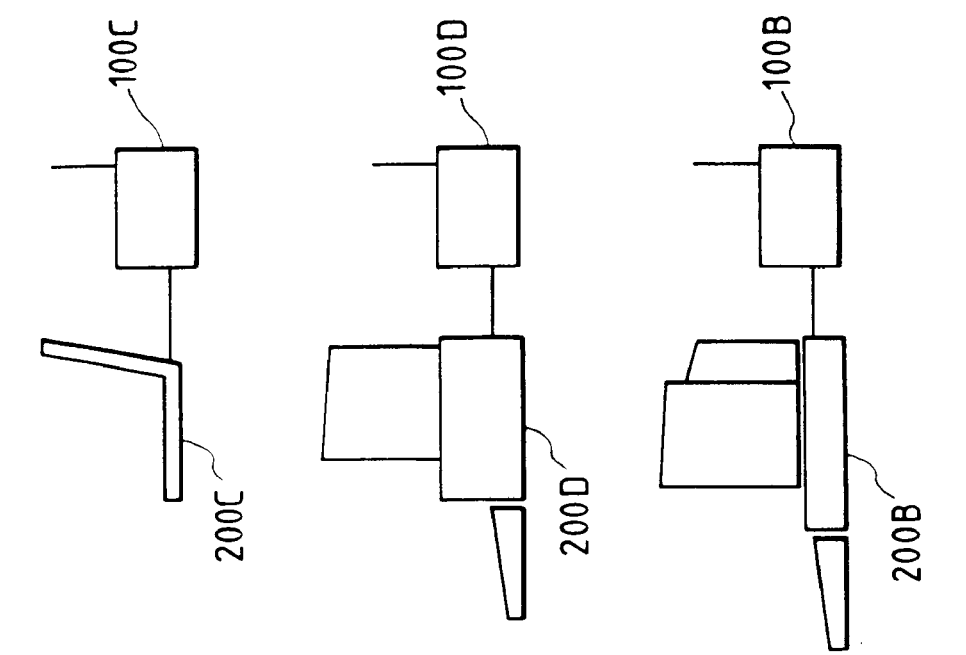
FIG. 2

FIG. 5

| ADDRESS | TERMINAL NAME | COMMUNICATION SPEED | BUFFER SIZE | DISPLAY |
|---|---|---|---|---|
| A | TERMINAL 1 | 9600bps | 256kByte | MONOCHROME |
| B | COLOR 1 | 96000bps | 640kByte | COLOR |
| C | COLOR 2 | 19200bps | 512kByte | COLOR |
| D | TERMINAL 2 | 2400bps | 64kByte | MONOCHROME |
| E | TERMINAL 3 | 1200bps | 32kByte | MONOCHROME |

SPREAD SPECTRUM COMMUNICATION APPARATUS

This is a continuation of co-pending application Ser. No. 08/546,899, filed on Oct. 23, 1995, which is a continuation of Ser. No. 08/298,055, filed on Aug. 30, 1994.

BACKGROUND OF THE INVENTION

1. Field of the Invention

The invention relates to a spread spectrum communication apparatus for communicating through a plurality of communication channels corresponding to a plurality of diffusion codes.

2. Related Background Art

Hitherto, in an image processing apparatus having a communication apparatus, there is an image processing apparatus for transmitting data such as image data in a wireless manner. According to such an apparatus, by communicating an image processing apparatus and another image processing apparatus by using a radio communication, image data or the like is transmitted. For example, a spread spectrum communication system has been proposed as a communication system.

Generally, data communication is performed by a single channel in the spread spectrum communication. However, in the case where there is a difference between data processing speeds on the transmission side and reception side, the processing speed of the system is limited by the communicating speed of the spread spectrum communication. Consequently, even when an apparatus having a high data processing speed is connected, its ability cannot be sufficiently effected.

Particularly, in the present office environment, many OA apparatuses for mainly performing image processes are used and it is strongly demanded to execute the efficient data communication among them.

SUMMARY OF THE INVENTION

It is an object of the invention to provide a spread spectrum communication apparatus which can sufficiently effect an ability of another apparatus.

Another object of the invention is to provide spread spectrum communication apparatus and method for communicating through a plurality of communication channels of the number corresponding to the number of communication partners.

Still another object of the invention is to provide spread spectrum communication apparatus and method for communicating through a plurality of communication channels of the number corresponding to a communication data quantity.

Further another object of the invention is to set the number of communication channels for spread spectrum to a proper value in accordance with whether a communication partner has a color terminal or a black and white terminal or whether binary image data is processed or multivalue image data is processed.

The above and other objects and features of the present invention will become apparent from the following detailed description and the appended claims with reference to the accompanying drawings.

BRIEF DESCRIPTION OF THE DRAWINGS

FIG. 2 is a diagram showing constructional examples of a network system using the embodiment;

FIG. 5 is a diagram showing an example of a data table;

DETAILED DESCRIPTION OF THE PREFERRED EMBODIMENTS

A communication apparatus of an embodiment according to the invention will now be described in detail hereinbelow with reference to the drawings.

Figure 1:
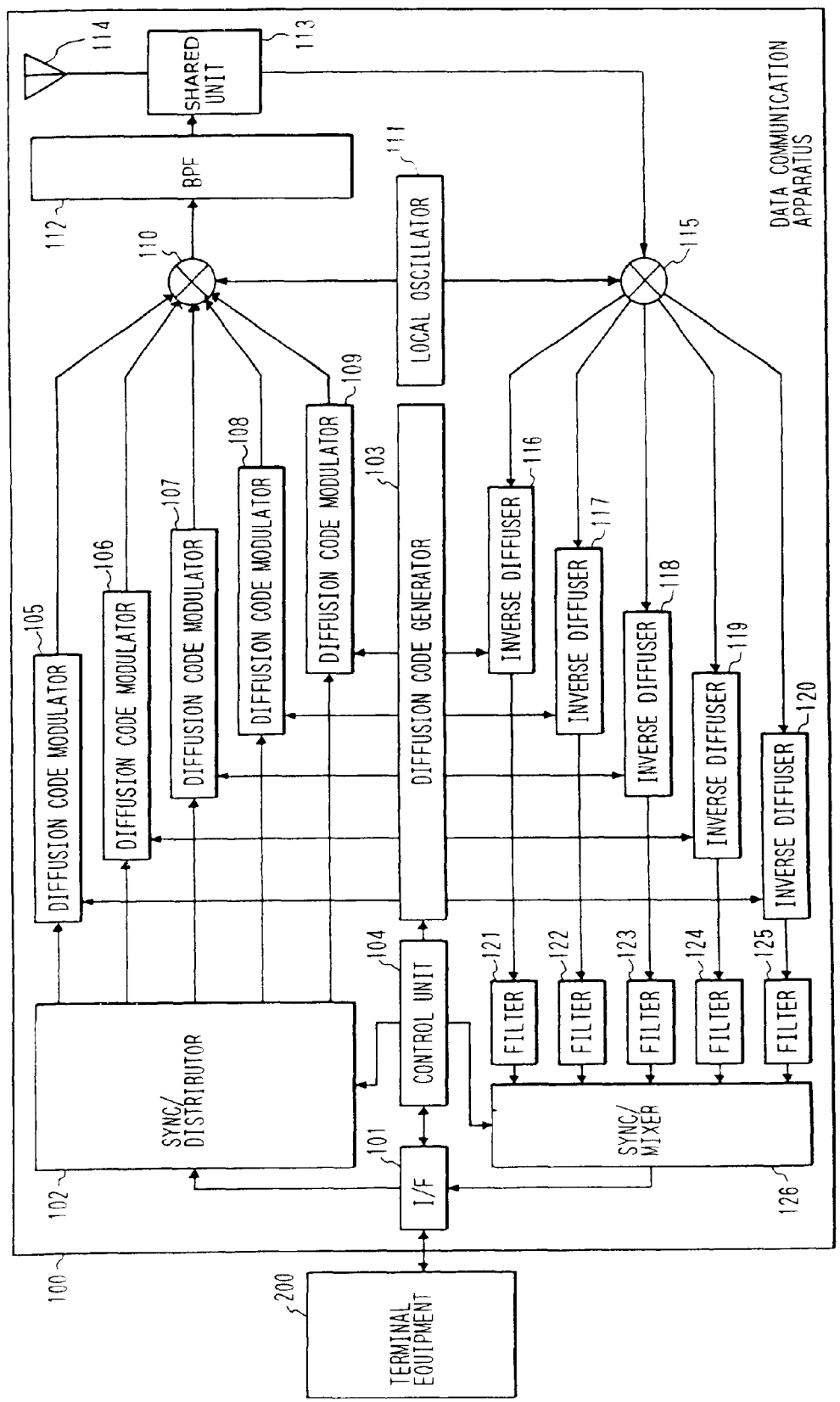
FIG. 1 is a constructional diagram of a communication apparatus of the first embodiment of the invention.

FIG. 1 is a block diagram of a data communication apparatus expressing most preferably a feature of the embodiment according to the invention.

Reference numeral 100 denotes a data communication apparatus and 200 indicates a terminal equipment such as work station, digital copying apparatus, facsimile, data communication terminal, or the like.

A data train generated from the terminal equipment 200 is sent to a sync/distributor 102 through an interface 101. The data train is distributed by the sync/distributor 102 in accordance with distribution factors such as transmission and data kind and the like. The data train distributed by the sync/distributor 102 is diffusion code modulated by diffusion code modulators 105 to 109 by a plurality of different diffusion codes which are produced by a diffusion code generator 103.

Outputs of the diffusion code modulators 105 to 109 are mixed by a mixer 110 together with a frequency oscillated by a local oscillator 111. The mixed signal passes through a band pass filter 112 and, after that, it is transmitted from an antenna 114 via a shared unit 113 for sharing the antenna.

On the other hand, the radio wave captured by the antenna 114 is input to a mixer 115 via the shared unit 113 and is mixed to the frequency oscillated by the local oscillator 111. An output signal from the mixer 115 is input to inverse diffusers 116 to 120 and is respectively demodulated to original signals by a plurality of different diffusion codes which are produced by the diffusion code generator 103.

Signals other than the target signals are eliminated by filters 121 to 125 from the demodulated original signals, respectively. The resultant signals are combined to one signal by a sync/mixer 126. After that, the signal is transmitted to the terminal equipment 200 through the interface 101.

A control unit 104 controls the interface 101, sync/distributor 102, diffusion code generator 103, sync/mixer 126, and the like and controls an instruction about the distribution number, hand shake with the terminal equipment 200, kind of diffusion code to be produced, and the like.

FIG. 2 shows a constructional example of a system using the embodiment.

In the diagram, reference numerals 100A to 100D indicate data communication apparatuses of the spread spectrum system having a construction common to the communication apparatus 100 in FIG. 1. Those apparatuses are connected to various terminal equipment through an exclusive-use high speed communication interface or a general communication interface such as RS-232C or the like. The terminal equipment 200 includes a work station 200A as a server, a work station 200B as a client, a notebook type personal computer 200C, a desktop type personal computer 200D, and the like. As shown in FIG. 1, the data communication apparatuses 100A to 100D have five communication channels. For example, when a color image is transmitted, data is transmitted by using three channels of the first to third channels. When a monochrome image is transmitted, data is transmitted by using one channel.

Figure 3:
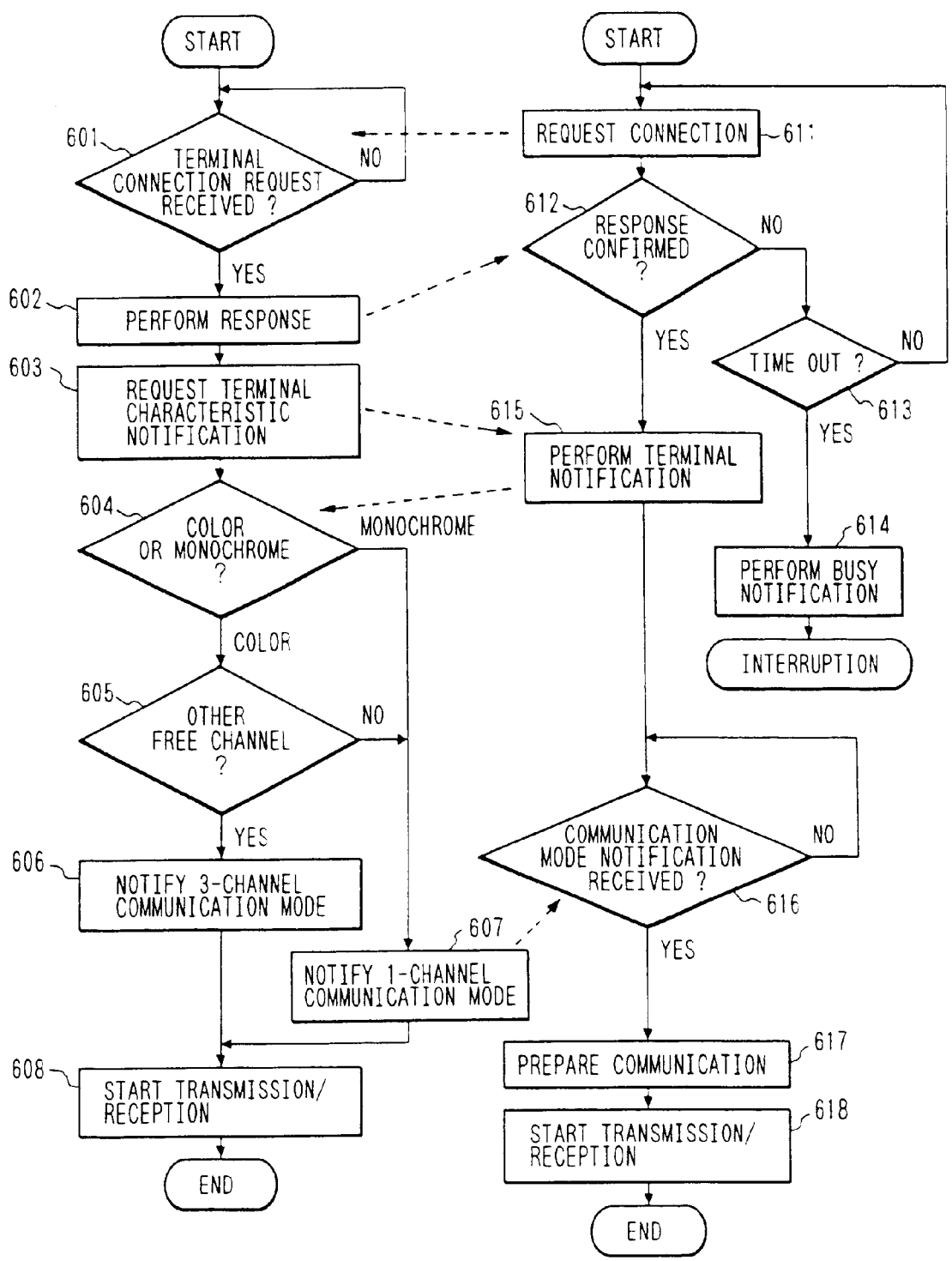
FIG. 3 is a flowchart showing an example of an operating procedure of the embodiment.

An example of a procedure until the session of the data communication is established in the system will now be described with reference to a flowchart of FIG. 3. The left side of FIG. 3 relates to an example of the operation on the server side 100A. The right side relates to an example of the operation on the client side 100B to 100D. Arrows shown by broken lines connecting the flow on the server side and the flow on the client side indicate the timing relations between them.

First, the server side 100A sequentially receives the communication channels 1 to 5 and always monitors connection requests from the terminal equipment 200B to 200D (601). When the connection request is received via either one of the communication channels 1 to 5, a response indicative of the request permission is first returned (602), thereby requesting the terminal equipment which generated the connection request so as to notify terminal characteristics (603). When the terminal characteristics are notified, a check is made to see if the terminal is a color image terminal or a monochrome terminal (604).

In case of the color image terminal, presence or absence of a free channel is examined (605). When three channels can be assured as communication channel number, a fact that the data communication is performed in the 3-channel communication mode and the channel number to be used are informed to the client side (606). When three channels cannot be assured, a fact that the data communication is executed in the 1-channel communication mode is notified to the client side (607).

In case of the monochrome image terminal, a fact that the data communication is executed by using the communication channel (one channel) which is at present performing the communication to start data transmission and reception is informed to the client side (607).

After that, the data from the terminal equipment 200 is distributed by the sync/distributor 102 to one of the diffusion code modulators 105 to 109 corresponding to the selected channel in steps 606 and 607 and the transmission and reception are started (608).

On the other hand, the client side 100B to 100D first transmits the connection request to the server side by using an arbitrary free channel (611). The apparatus waits for the response from the server side (612). When there is no response, after the elapse of a predetermined time (613), for example, a busy notification is supplied to the terminal 200 in order to indicate that the connection request failed (614). After that, the communication start session is interrupted.

When there is a response, the terminal characteristics (which have previously been registered in the control unit 104) requested from the server side are transmitted (615). The apparatus waits for the notification of the communication mode from the server side (616). The transmission and reception is prepared by the sync/mixer 126 in the channel designated from the server side (617). The apparatus waits for the data reception. After that, the data communication is started (618).

According to the embodiment as mentioned above, the data communication apparatus of the spread spectrum system has a plurality of diffusion code modulators and the supplied data train to be transmitted is distributed and the data is diffused by a plurality of diffusion codes. Consequently, the data can be transmitted at an almost same speed to transmission destination sides such as color image terminal equipment, monochrome image terminal equipment, and the like whose data quantities are different.

A communication apparatus of the second embodiment according to the invention will now be described hereinbelow. In the second embodiment, portions having substantially the same constructions as those in the first embodiment are designated by the same reference numerals and their detailed descriptions are omitted here.

Figure 4:
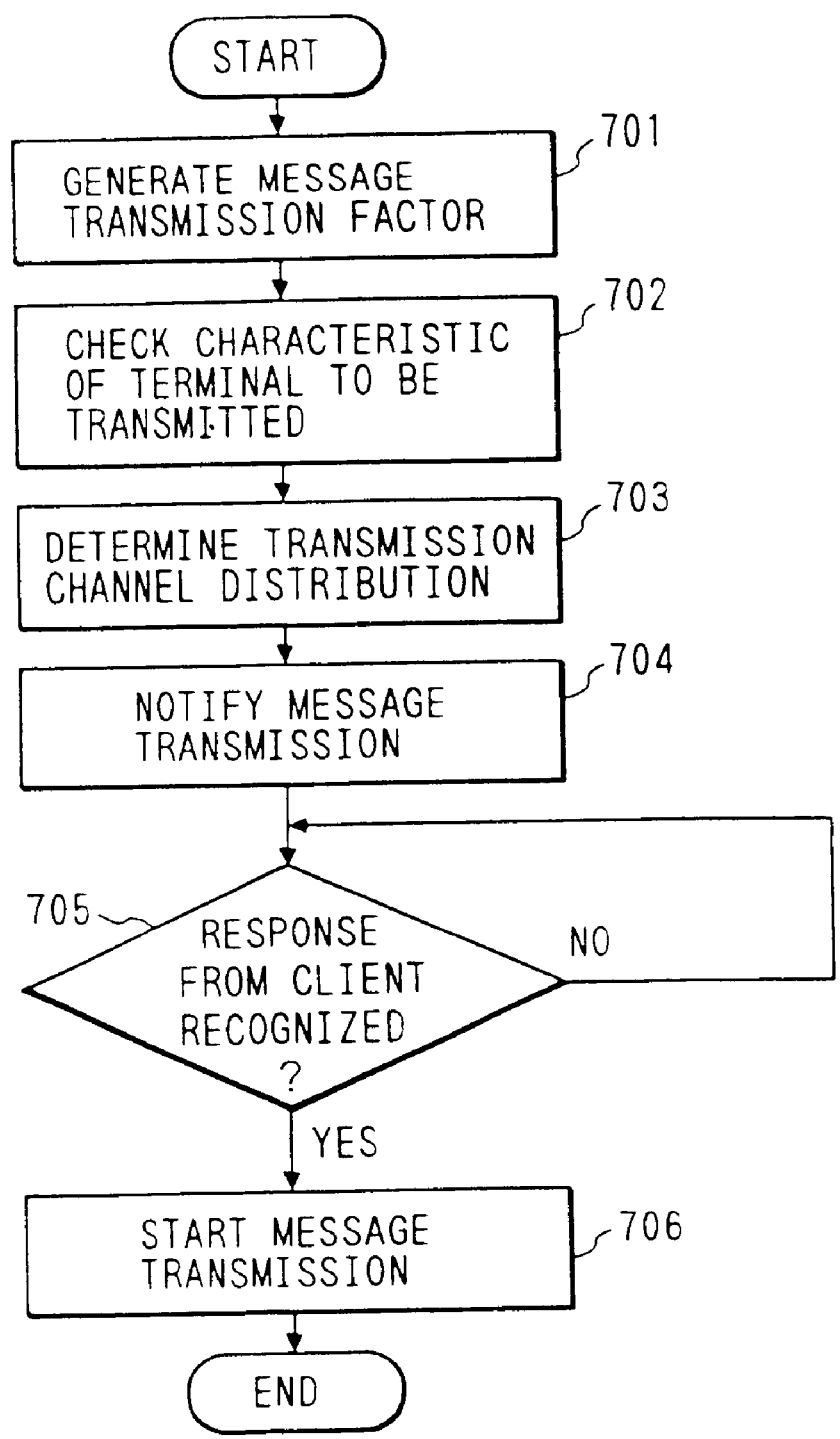
FIG. 4 is a flowchart showing an example of an operating procedure in the second embodiment according to the invention.

In the embodiment, in a system construction comprising one server machine and a plurality of client machines as shown in FIG. 2, the data communication apparatus 100A on the server side characterized in that the multiple communication is executed from the server side to a specific terminal equipment on the client side will now be described. The data communication apparatuses 100A to 100D in the embodiment have a construction in which, for example, there are ten communication channels of the data communication apparatus in FIG. 1. Among them, the communication channel 1 is a communication channel for common information and hand shake and is a channel to perform internal communication between the server and the client. An example of an operating procedure of the embodiment will now be described with reference to a flowchart shown in FIG. 4.

When a message transmission factor such as transmission of an electronic mail, emergency communication to inform an abnormality of the server, or the like occurs on the server side 200A (701), the server 200A examines the characteristics of the terminal equipment to be transmitted from a data table as shown in FIG. 5 as an example provided in the server 200A (702) and sends to the control unit 104 of the data communication apparatus 100A. The control unit 104 determines the distribution of the optimum transmission channel from the channel number and the number of terminal equipment on the transmission destination side (703). A fact that a broadcast message is transmitted by using the communication channel 1 is transmitted to the terminal equipment 200B to 200D (704).

It is also possible to construct in a manner such that a table shown in FIG. 5 is registered into the control unit 104 and the control unit 104 decides the transmission channel on the basis of the notification of the transmission destination side from the server 200A.

It is now assumed that, as for the transmission channels, for example, three channels are distributed to the color image terminal equipment and one channel is distributed to the monochrome image terminal equipment and nine channels are divided on the basis of the color terminal and the black and white terminal. The reason why three channels are distributed to the color image terminal equipment is to transmit data of red (R), green (G), and blue (B) in parallel.

The apparatus waits for the response via the communication channel 1 from the terminal equipment in response to the notification of the message transmission (705). After the response was confirmed, the transmission data is distributed to the channel decided in step 703 by the sync/distributor 102 and the message transmission is started (706).

As mentioned above, according to the embodiment, the data communication apparatus of the spread spectrum system has a plurality of diffusion code modulators and the supplied data train to be transmitted is distributed and the data is diffused by a plurality of diffusion codes, so that a series of data train can be transmitted in parallel to the different transmission destination sides. Further, in the parallel transmission, by changing a distribution ratio of the channel for each communication target, the data can be transmitted at an almost same speed to the transmission destination sides such as color image terminal equipment, monochrome image terminal equipment, and the like having different data quantities.

A high speed data communication apparatus will now be described as a third embodiment according to the invention. In the third embodiment, the portions having substantially the same constructions as those in the first embodiment are designated by the same reference numerals and their detailed descriptions are omitted here.

Figure 6:
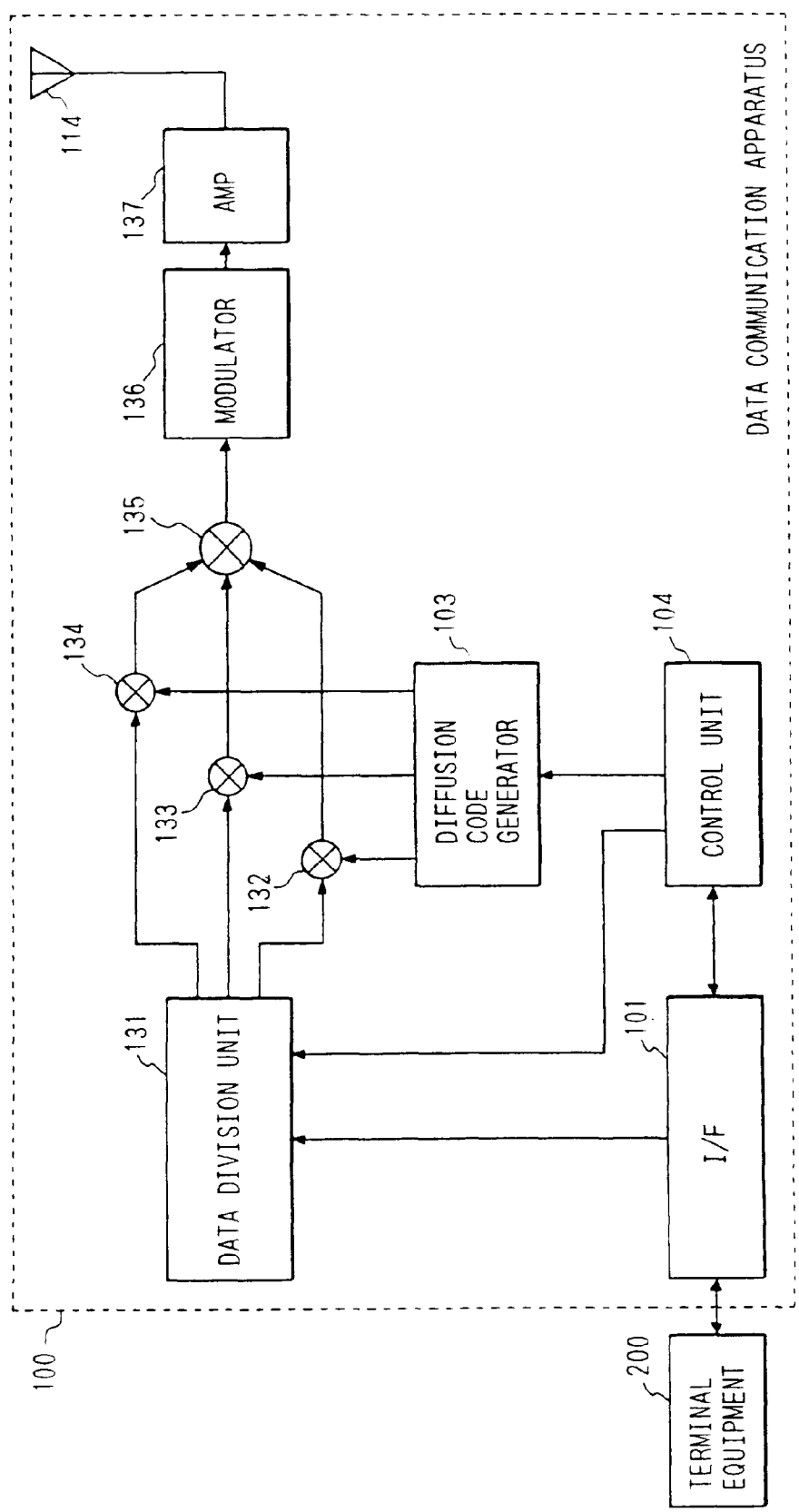
FIG. 6 is a block diagram showing an example of a construction of a communication apparatus in the third embodiment according to the invention.

FIG. 6 is a block diagram of a transmission unit of a data communication apparatus of the spread spectrum system expressing most preferably a feature of the embodiment.

In the diagram, the data train sent from the terminal equipment 200 is transmitted to a data division unit 131 through the interface 101 in accordance with the control of the control unit 104. Further, control signals indicative of the transmission mode, transmission destination side of the data train, and the like are sent from the terminal equipment 200 to the control unit 104.

The data division unit 131 divides the input data train into data portions each having an arbitrary length and adds data indicative of the order relation of the data train to the divided data portions and supplies the resultant data to multipliers 132 to 134. A dividing method and the division number are designated by the control unit 104. That is, the data can be supplied to three channels by the data division unit 131. Any one of the modes such as mode in which one transmission content is divided and all channels are occupied and the divided data is transmitted by all channels, mode in which individual contents are transmitted by three channels, and the like can be freely set.

The diffusion code generator 103 transmits the diffusion codes which were set so that the mutual correlation is enough small to the multipliers 132 to 134. The data train generated from the data division unit 131 is multiplied by the multipliers 132 to 134 to the diffusion codes generated from the diffusion code generator 103 and is diffusion coded. Output signals from the multipliers 132 to 134 are mixed to one signal by a mixer 135. The mixed signal is modulated by a modulator 136 and is power amplified to a specified output by an amplifier 137. After that, the amplified signal is transmitted from the antenna 114.

A construction of the reception unit is common to that in FIG. 1.

Figure 7:
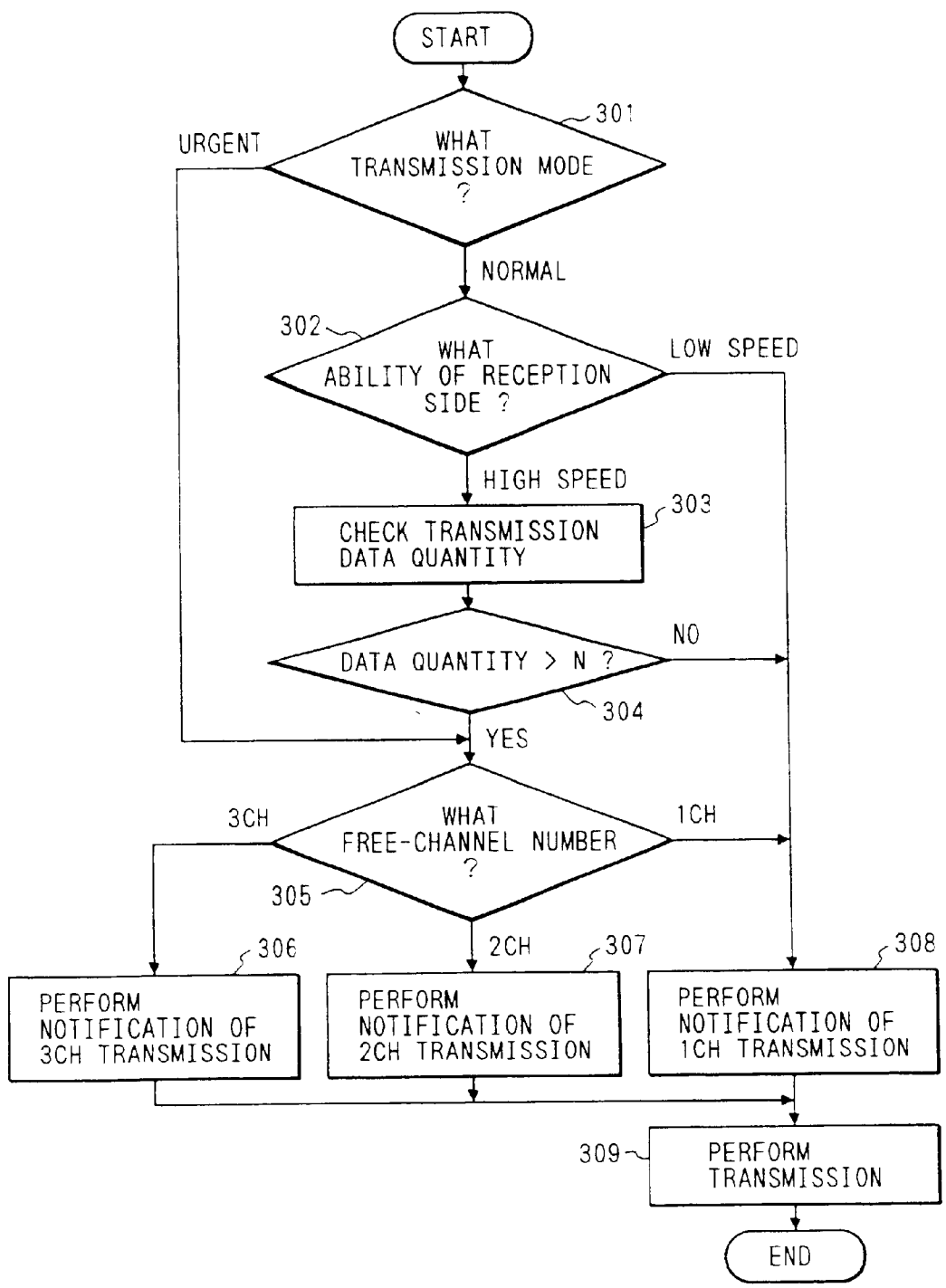
FIG. 7 is a flowchart showing an example of an operating procedure of the third embodiment.

The operation of the control unit 104 in the embodiment will now be described with reference to a flowchart shown in FIG. 7.

In case of transmitting the data of the terminal equipment 200 (for example, in case of transmitting the image data of the terminal equipment 200 to an image processing apparatus (not shown)), the transmission mode designated by the terminal equipment 200 is first judged (step 301). When the transmission mode is an urgent mode, a free channel is soon checked (305). The free channel is notified to the reception side (306 to 308). The transmission data is divided by the data division unit 131 so as to use all of the free channels and the transmission is started (309).

On the other hand, when the transmission mode is a normal mode, a reception speed on the reception side is detected on the basis of the table of FIG. 5 (302). When the reception speed is low, a fact that the data is transmitted by one channel is informed to the reception side (308). The transmission is started (309).

When the partner side can receive data at a high speed, a total quantity of communication data notified from the terminal equipment 200 is examined (303). When the total data quantity doesn't exceed a predetermined value N (304), a fact that the data is transmitted by one channel is informed to the reception side (308) and the transmission is started (309). When the total data quantity exceeds N (304), a free channel is checked (305). After that, the transmission is started by using all of the free channels in a manner similar to the urgent mode.

The data division unit 131 divides the data train in accordance with the number of free channels instructed from the control unit 104 and transmits to the free channels and also sets statuses of the used channels into "in-use".

The above explanation has been made on the assumption that the transmission side and the reception side have the same number of diffusion codes. However, in the case where they don't have the same number of diffusion codes, a procedure to check whether the communication can be performed by the selected free channel or not is executed simultaneously with the check of the free channel.

According to the embodiment as mentioned above, the data communication apparatus of the spread spectrum system has a plurality of diffusion code modulators and the supplied data train to be transmitted is divided and is data diffused by a plurality of diffusion codes, so that the series of data train can be transmitted in parallel. By changing the number of channels which are used in accordance with a situation of traffic, the data can be transmitted at a high speed while keeping an efficiency of the whole network.

As a fourth embodiment according to the invention, a data communication apparatus of the spread spectrum system for transmitting data to a plurality of output apparatuses in parallel will now be described. In the fourth embodiment, the portions having substantially the same constructions as those in the first and third embodiments are designated by the same reference numerals and their detailed descriptions are omitted here.

Figure 8:
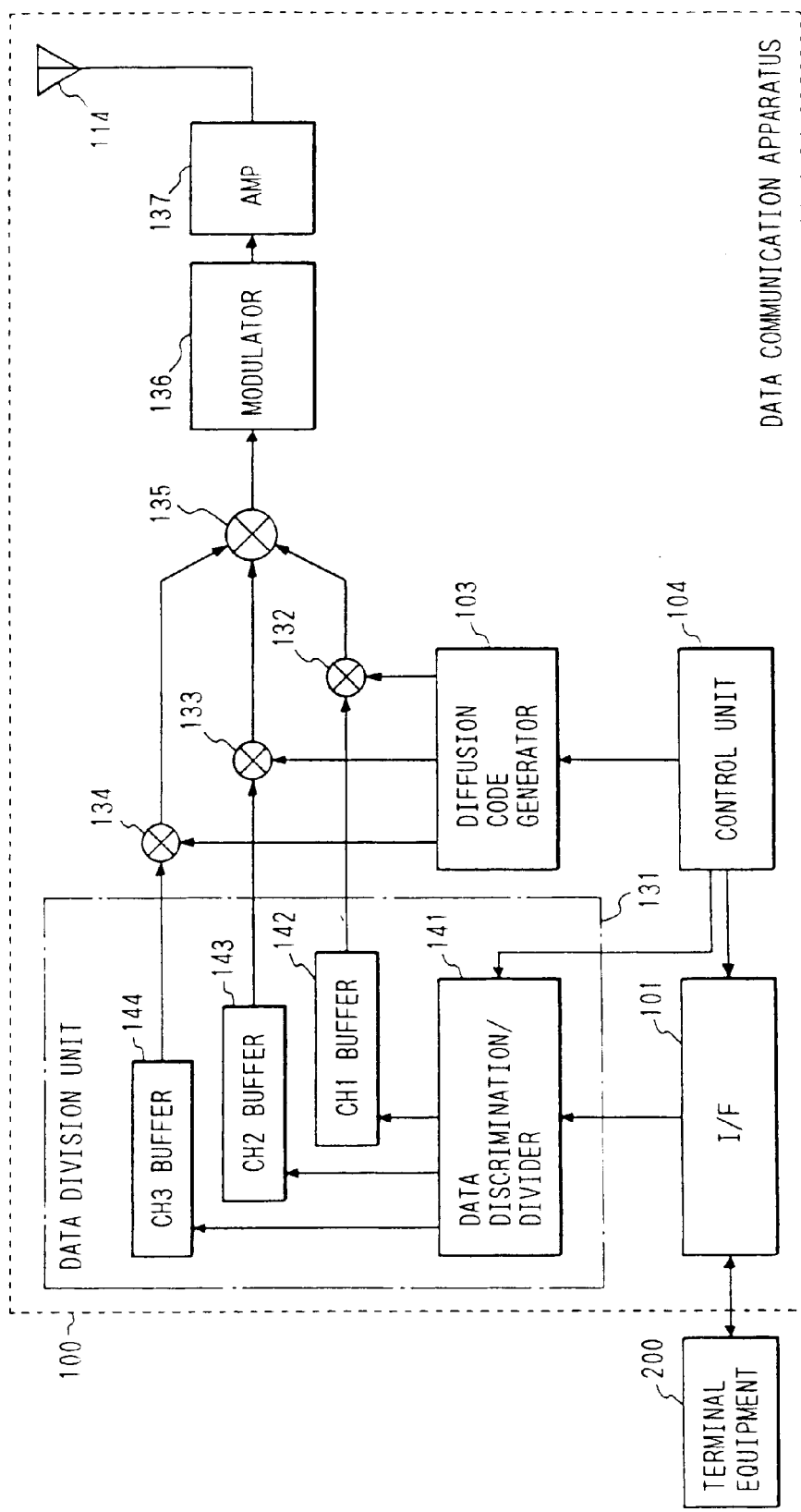
FIG. 8 is a block diagram showing a constructional example of a communication apparatus of the fourth embodiment according to the invention.

FIG. 8 is a block diagram expressing most preferably a feature of the fourth embodiment.

In the diagram, the data train transmitted from the terminal equipment 200 is sent to the data division unit 131 through the interface 101 in accordance with a control signal of the control unit 104. The data train sent to the data division unit 131 is first divided by a data discrimination/divider 141 and sent to either one of a CH1 buffer 142, a CH2 buffer 143, and a CH3 buffer 144. Control signals indicative of a transmission request (communication apparatus activation signal), information of the partner to be transmitted, a dividing method of the data, division number, and the like are sent from the terminal equipment 200 to the control unit 104.

The data train input to the CH1 buffer 142 to CH3 buffer 144 is buffered and is sequentially sent to the multipliers 132 to 134. Namely, the data can be supplied to three channels by the data division unit 131 and, moreover, the data division unit 131 has the buffers. Therefore, the terminal equipment 200 can transmit the data at a high speed without being worried about a reception speed or hand shake of the reception side. For example, the data train in which color image data and monochrome text data are arranged in accordance with an arbitrary order can be divided almost simultaneously output to the printers in a manner such that the image data is supplied to the color printer and the text data is supplied to the monochrome printer.

The diffusion code generator 103 sends the diffusion codes which were set so that the mutual correlation is enough small to the multipliers 132 to 134. The data train output from the data division unit 131 is multiplied by the multipliers 132 to 134 to the diffusion codes generated from the diffusion code generator 103 and is diffusion coded. The signals output from the multipliers 132 to 134 are mixed to one signal by the mixer 135 and is modulated by the modulator 136 and is power amplified to a specified output by the amplifier 137. After that, the amplified signal is transmitted from the antenna 114.

A construction of the reception unit is common to that of FIG. 1.

Figure 9:
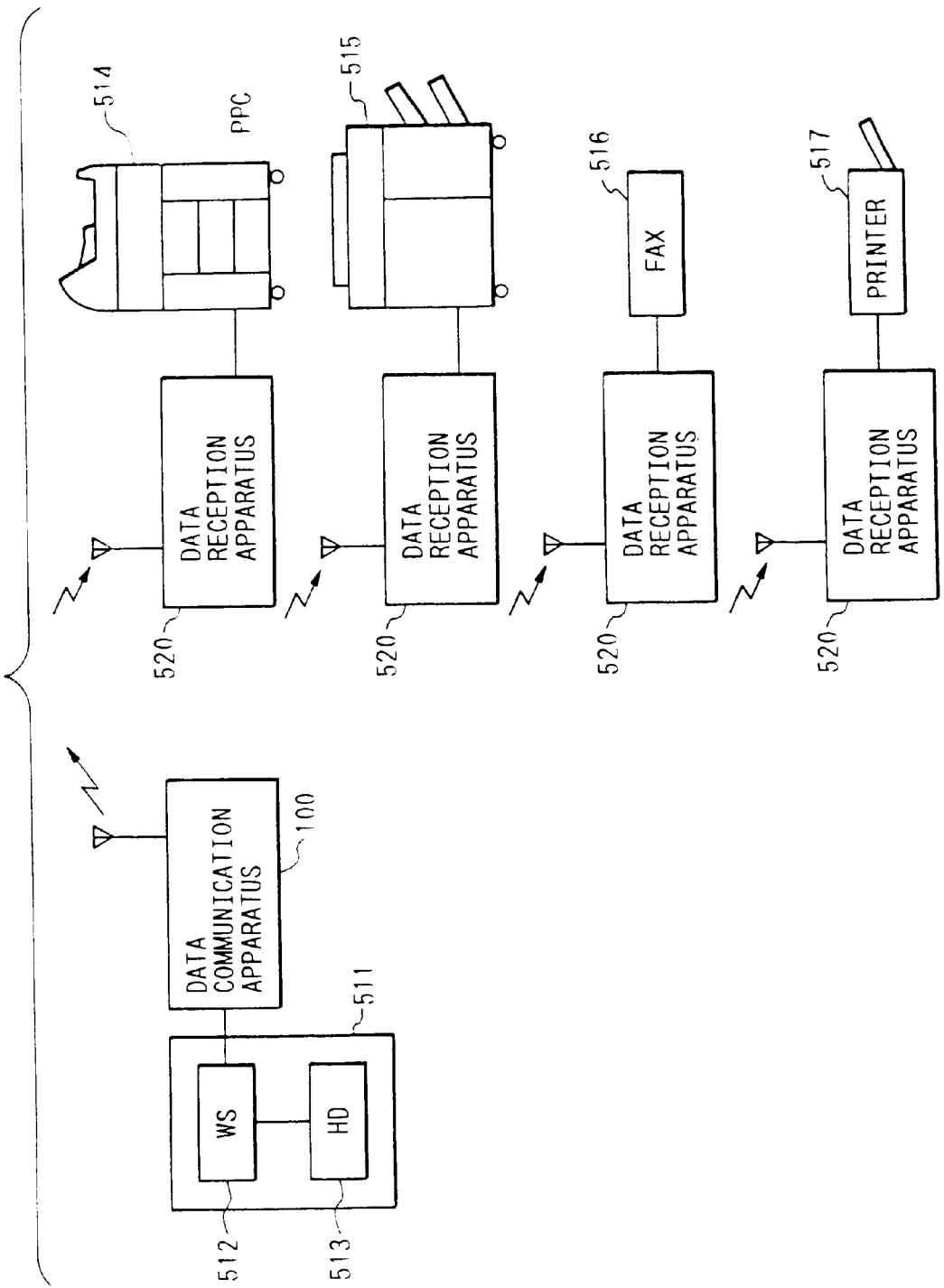
FIG. 9 is a diagram showing a constructional example of a network system using the fourth embodiment.

A system using the data communication apparatus 100 of the embodiment will now be described with reference to FIG. 9.

A data supplying apparatus 511 connected to the data communication apparatus 100 comprises a work station (hereinafter, referred to as a WS) 512 and a large capacity auxiliary storage apparatus (hereinafter, referred to as an HD) 513 connected to the WS 512. A data reception apparatus 520 is connected to a copying apparatus (hereinafter, referred to as a PPC) 514, a color PPC 515, a facsimile apparatus (hereinafter, referred to as an FAX) 516, and a printer 517, respectively. The data reception apparatus 520 receives the data while performing a hand shake with the data communication apparatus 100 and supplies the received data to an output apparatus connected.

Figure 10:
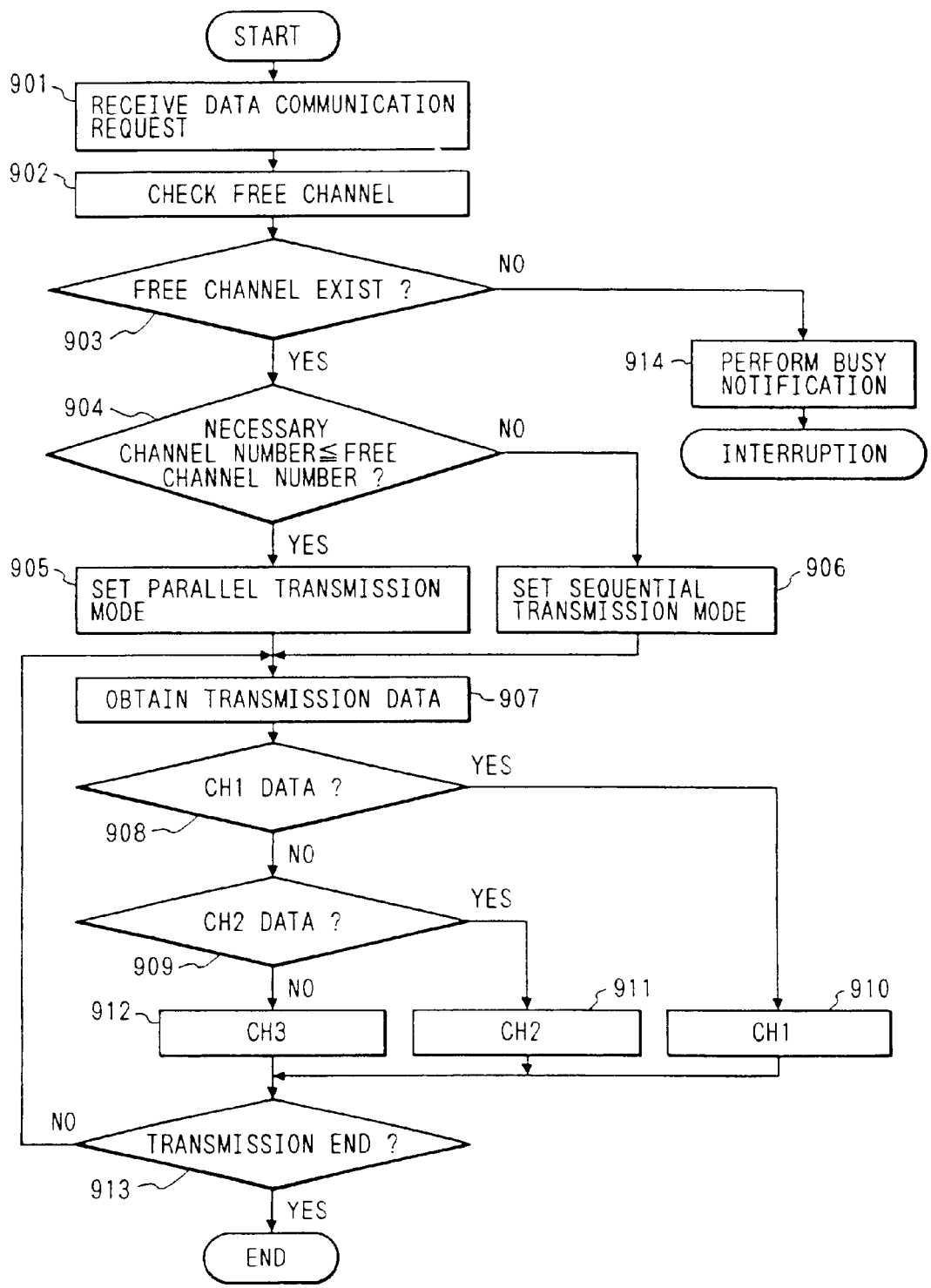
FIG. 10 is a flowchart showing an example of an operating procedure of the fourth embodiment.
Figure 11:
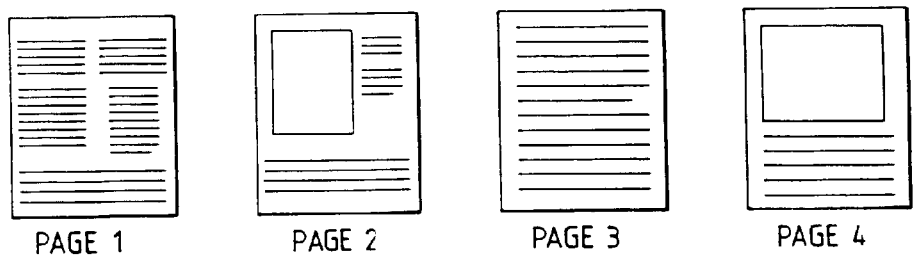
FIG. 11 is a diagram showing an example of data which is transmitted.

An example of an operating procedure of the data communication apparatus 510 will now be described with reference to a flowchart shown in FIG. 10. It is now assumed that data to be transmitted is a file showing a document as shown in FIG. 11 as an example and that color images were inserted in the second and fourth pages in a document.

The data communication apparatus 100 executes the transmission by the following procedure in order to transmit the page including the color image to the color PPC 515 and the page comprising only a text to the PPC 514.

First, when the transmission request of data is received from the data supplying apparatus 511 (901), a free channel is searched (902). When there is no free channel (903), a fact that the transmission is impossible is informed to the data supplying apparatus 511 by a busy notification or the like (914). After that, the process is interrupted.

When there are free channels, the number of free channels is compared with the number of necessary channels (904). When the number of free channels is smaller than the necessary channel number, for example, a sequential transmission mode to transmit the data by one channel is set (906). When the necessary channels can be assured, for example, a parallel transmission mode to transmit the data by two channels is set (905). The data transmission is started.

Since information indicating to which apparatus the data is transmitted is added to the head of the data train obtained from the terminal equipment 200 in step 907, the data train is divided in accordance with such information by the data discrimination/divider 141 and is transmitted (908–912). The above process is repeated until the end of data transmission (913).

A difference of the throughputs of output apparatuses or a difference of the transmission data quantities are absorbed by the buffers 142 to 144. By dividing the data as mentioned above, the data can be transmitted almost simultaneously to a plurality of output apparatuses. Since a data quantity of color image is generally larger than that of monochrome image, for example, two channels are used for data transmission to the color PPC and, for instance, one channel is used for data transmission to the monochrome PPC.

According to the embodiment as mentioned above, since not only an effect almost similar to the third embodiment but also the data division unit has the buffers, the terminal equipment can transmit the data at a high speed without being worried about the reception speed or hand shake on the reception side. Therefore, for example, a data train in which color image data and monochrome text data are arranged in accordance with an arbitrary order can be divided and output almost simultaneously in a manner such that the image data is supplied to the color printer and the text data is supplied to the monochrome printer.

The present invention can be applied to a system comprising a plurality of equipment or can be also applied to an apparatus comprising one equipment.

The invention can be also applied to the case where it is accomplished by supplying a program to a system or an apparatus.

A communication apparatus of the fifth embodiment according to the invention will now be described hereinbelow in detail with reference to the drawings.

Figure 12:
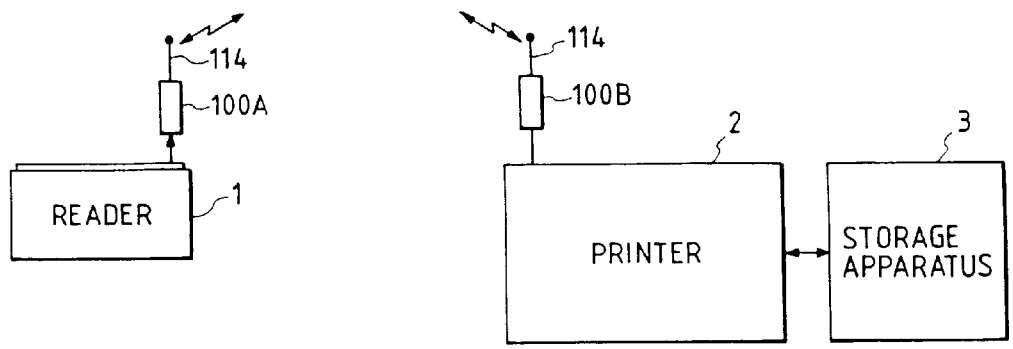
FIG. 12 is a diagram showing a system construction of the fifth embodiment.

FIG. 12 is a diagram showing an example of a construction of an image processing apparatus of the fifth embodiment using such a communication apparatus according to the invention.

In the diagram, reference numeral 1 denotes a reader to form the image data obtained by reading an original image and digitized; 2 a printer to print the image data sent from the reader 1 to a predetermined recording paper; and 3 a storage apparatus to store the image data sent from the reader 1.

Reference numerals 100A and 100B denote the communication apparatuses for spread spectrum communication each having four channels from the first channel to the fourth channel. The antenna 114 is commonly used as will be explained hereinlater.

Figure 13:
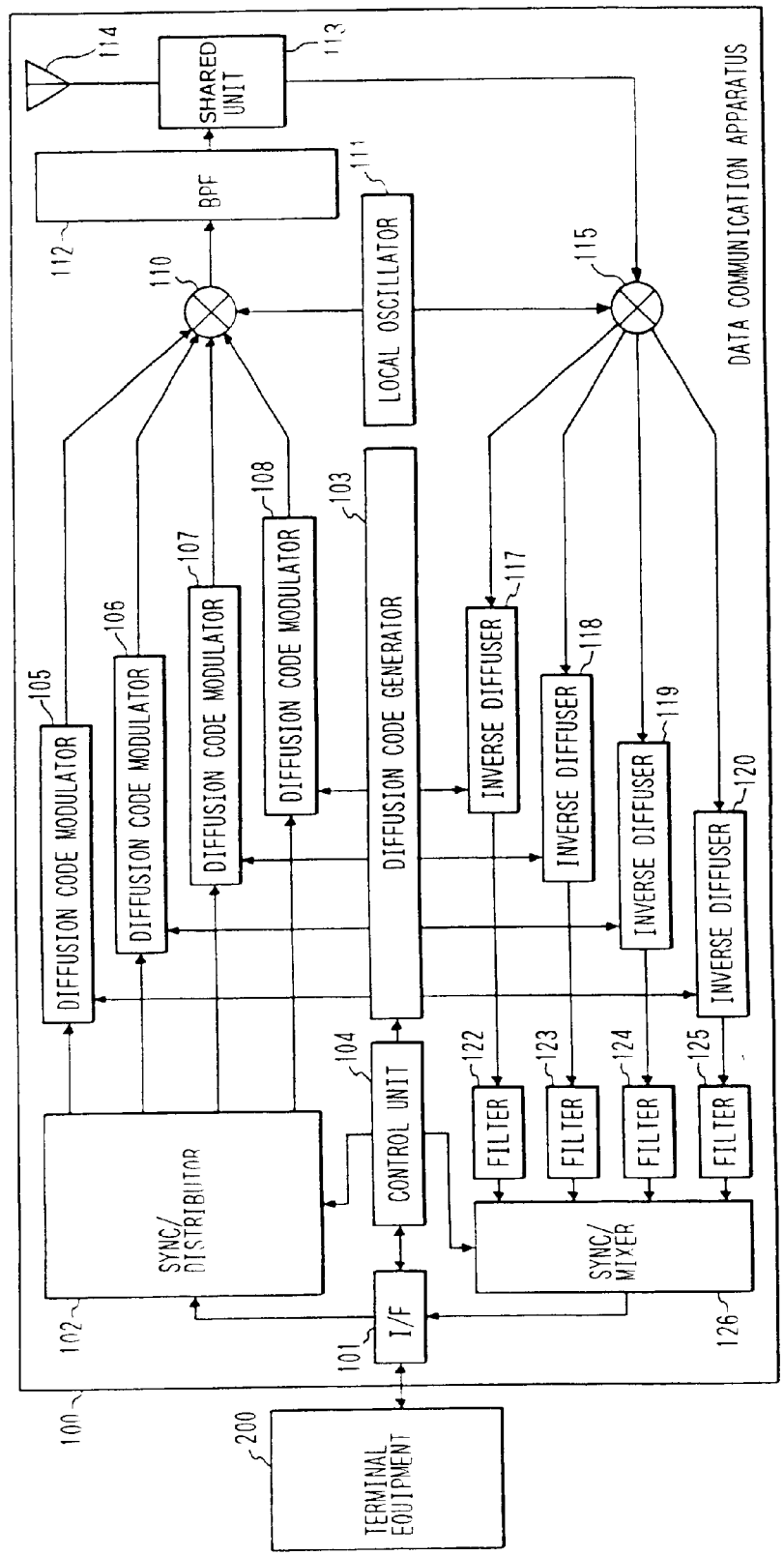
FIG. 13 is a block diagram showing a construction of a communication apparatus of the fifth embodiment.

FIG. 13 shows an example of a construction of the above communication apparatus according to the invention. In FIG. 13, the component elements similar to those in FIG. 1 are designated by the same reference numerals.

In FIG. 12, a mode to output the image data of the original read out by the reader 1 to the printer 2 is instructed from the reader 1, communication is performed between the first channel (diffusion code modulator 105) of the communication apparatus 100A connected to the reader 1 and the first channel (inverse diffuser 120) of the communication apparatus 100B connected to the printer 2. Therefore, the diffusion codes for use in only the printer 2 are automatically set into the diffusion code modulator 105 and inverse diffuser 120 shown in FIG. 13. The reader 1 executes the reading operation of the original image at a speed synchronized with the image data processing speed of the printer 2. The synchronization between the reader 1 and the printer 2 is executed by a control signal or the like which is sent from the printer 2.

In the actual communication, the control signal and image data are time-divisionally data transferred, thereby obtaining a target image output.

Explanation will now be made with respect to the case where a mode such that the image data of the original read by the reader 1 is subsequently transmitted to the storage apparatus 3 and the image data is stored is designated from the reader 1.

Since the communication apparatus for the storage apparatus 3 commonly uses the communication apparatus 100B connected to the printer 2, the communication with the reader 1 is executed via the printer 2. Specifically speaking, the communication is performed between the four channels (inverse diffusers 117 to 120) of the first to fourth channels of the communication apparatus 100B connected to the printer 2 and the four channels (diffusion code modulators 105 to 108) of the first to fourth channels of the communication apparatus 100A connected to the reader 1. The diffusion codes for use in only the storage apparatus 3 are automatically set into the diffusion code modulators 105 to 108 and inverse diffusers 117 to 120 shown in FIG. 13 of the respective channels. For example, the first channel is allocated to the control signal and the second to fourth channels are allocated to the image data. The reader 1 executes the image reading operation at a high speed synchronized with the storing speed of the storage apparatus 3. The synchronization between the reader 1 and the storage apparatus 3 is performed by a control signal or the like which is sent from the storage apparatus 3.

According to the embodiment as mentioned above, since the communication channel is allocated in accordance with the processing speed of the printer 2 or the processing speed of the storage apparatus 3, the image data process can be performed at a speed according to the processing ability of each apparatus. There is an effect such that the individual ability of the apparatus can be sufficiently effected.

A communication apparatus of the sixth embodiment according to the sixth embodiment will now be described hereinbelow. In the sixth embodiment, the portions having almost the same constructions as those in the first embodiment are designated by the same reference numerals and their detailed descriptions are omitted here.

Figure 14:
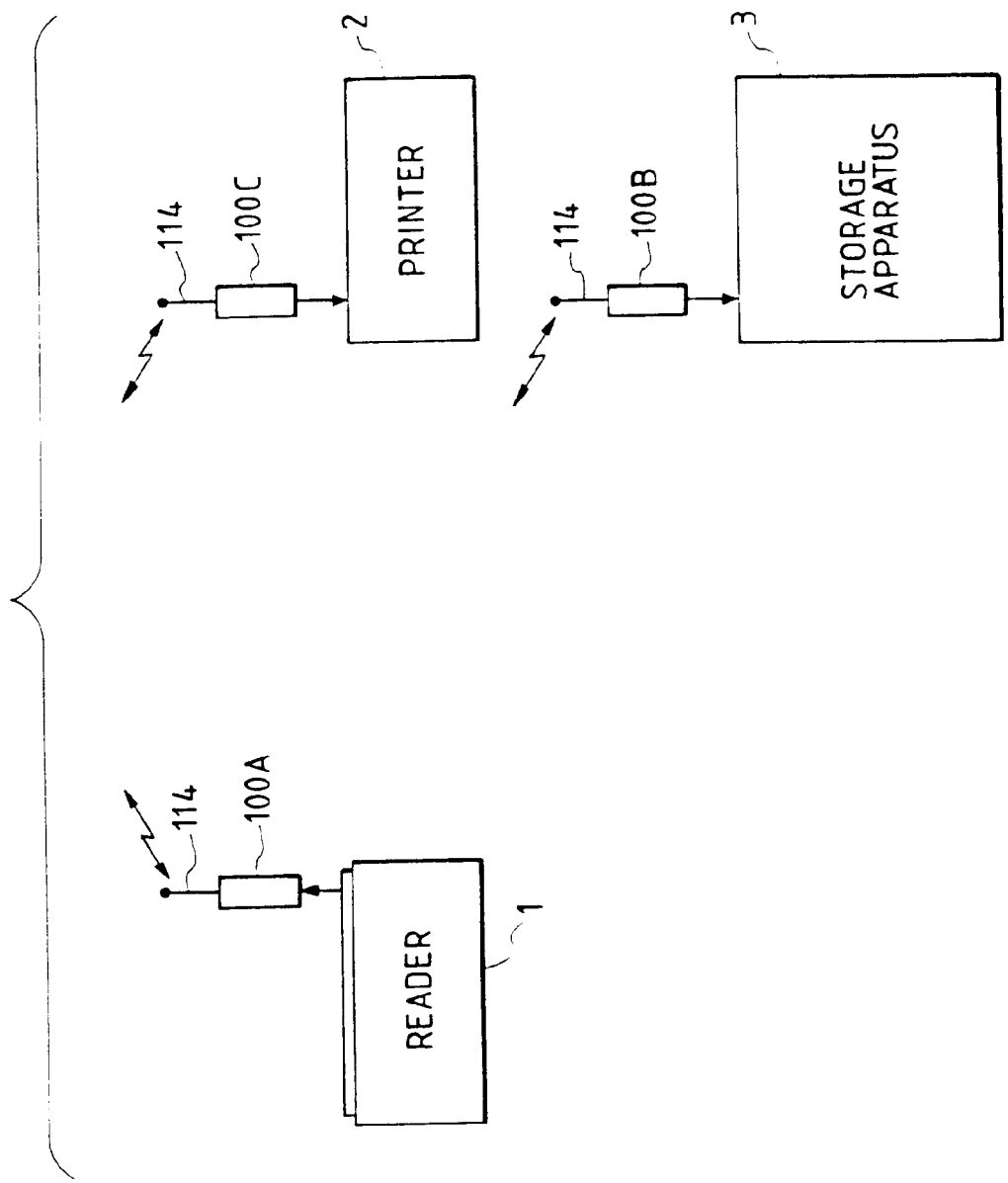
FIG. 14 is a diagram showing a system construction of the sixth embodiment.

FIG. 14 shows a constructional example of an image processing apparatus of the sixth embodiment using the communication apparatus according to the invention.

In the diagram, reference numeral 100C denotes the communication apparatus for the spread spectrum communication connected to the printer 2. The communication apparatus 100C has only one channel. Reference numeral 100B denotes the communication apparatus for the spread spectrum communication connected to the storage apparatus 3. The communication apparatus 100B has four channels of the first to fourth channels. Reference numeral 100A denotes the communication apparatus for the spread spectrum communication connected to the reader 1. The communication apparatus 100A has four channels of the first to fourth channels.

Figure 15:
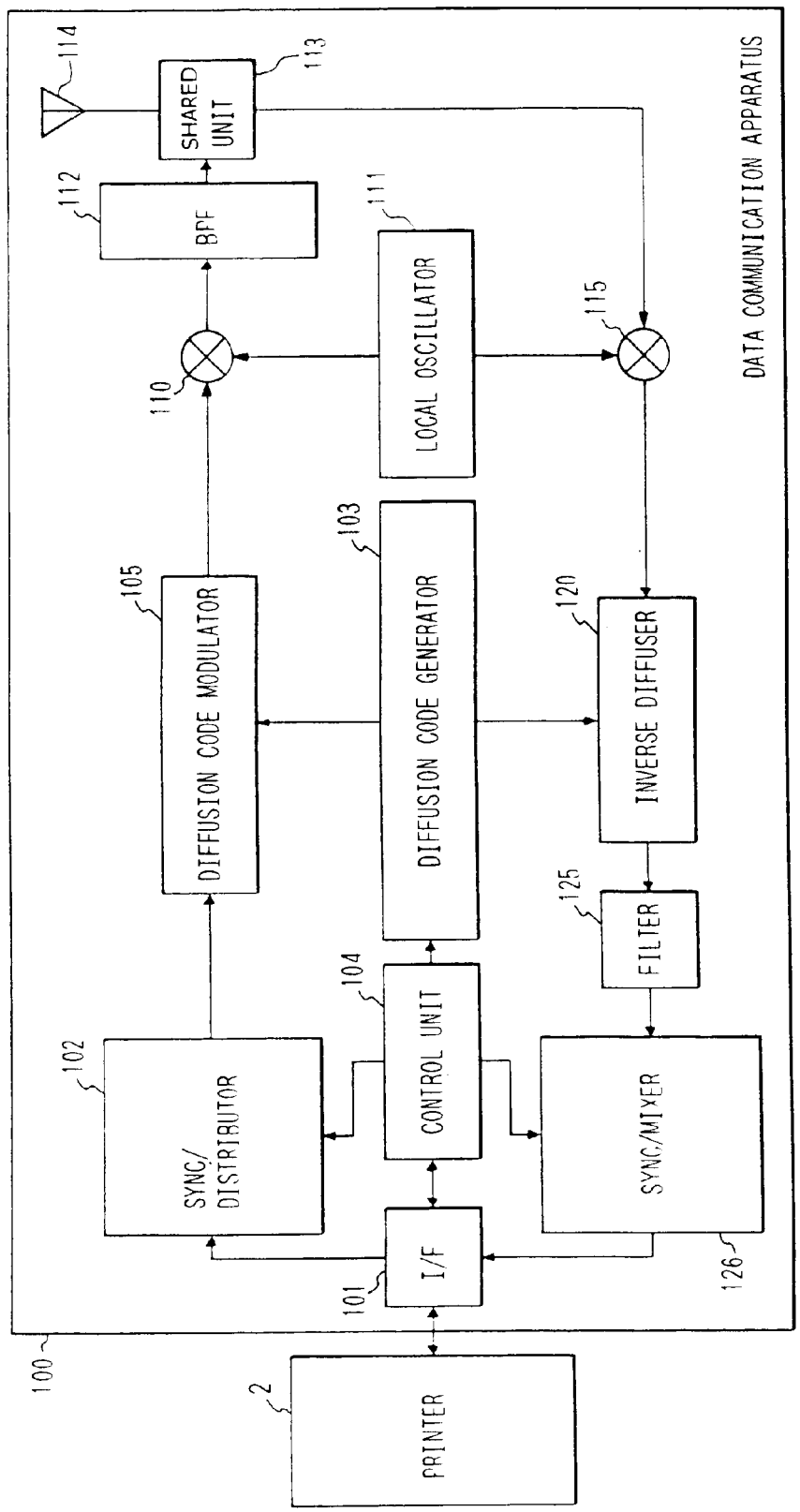
FIG. 15 is a block diagram showing a construction of a communication apparatus of the sixth embodiment.

The sixth embodiment differs from the fifth embodiment mentioned above with respect to a point that each of the printer 2 and the storage apparatus 3 has an own communication apparatus for the spread spectrum communication. An internal construction of each of the communication apparatuses 100A and 100B has substantially the same construction as that shown in FIG. 13. A construction of the communication apparatus 100C is shown in FIG. 15.

In FIG. 14, a mode to output the image data of the original read out by the reader 1 to the printer 2 is designated from the reader 1, communication is performed between the first channel of the communication apparatus 100A connected to the reader 1 and the first channel of the communication apparatus 100C connected to the printer 2. The diffusion codes for use in only the printer 2 are automatically set into the diffusion code modulator 105 and the inverse diffuser 120 shown in FIGS. 13 and 15. The reader 1 executes the reading operation of the original image at a speed synchronized with the image data processing speed of the printer 2. The synchronization between the reader 1 and the printer 2 is performed by a control signal or the like which is sent from the printer 2.

In the actual communication, the control signal and the image data are time-divisionally data transferred, thereby obtaining a target image output.

Explanation will now be made with respect to the case where a mode such that the image data of the original read out by the reader 1 is transmitted to the storage apparatus 3 and the image data is stored is designated from the reader 1.

In this case, the communication is performed between the four channels (diffusion code modulators 105 to 108) of the first to fourth channels of the communication apparatus 100A and the four channels (inverse diffusers 117 to 120) of the first to fourth channels of the communication apparatus 100B connected to the storage apparatus 3. The diffusion codes for use in only the storage apparatus 3 are automatically set into the diffusion code modulators 105 to 108 and inverse diffusers 117 to 120 shown in FIGS. 13 and 15 of the respective channels. For example, the first channel is allocated to the control signal, the second to fourth channels are allocated to the image data, and the reader 1 performs the image reading operation at a high speed synchronized with the storing speed of the storage apparatus 3. The synchronization between the reader 1 and the storage apparatus 3 is performed by a control signal or the like which is sent from the storage apparatus 3.

According to the embodiment as mentioned above, since the communication channel is allocated in accordance with the processing speed of the printer 2 or the processing speed of the storage apparatus 3, the image data process can be executed at a speed according to the processing ability of each apparatus. There is an effect such that the individual ability of the apparatus can be sufficiently effected.

A communication apparatus of the seventh embodiment according to the invention will now be described hereinbelow. In the seventh embodiment, the portions having almost the same constructions as those in the first embodiment are designated by the same reference numerals and their detailed descriptions are omitted here.

Figure 16:
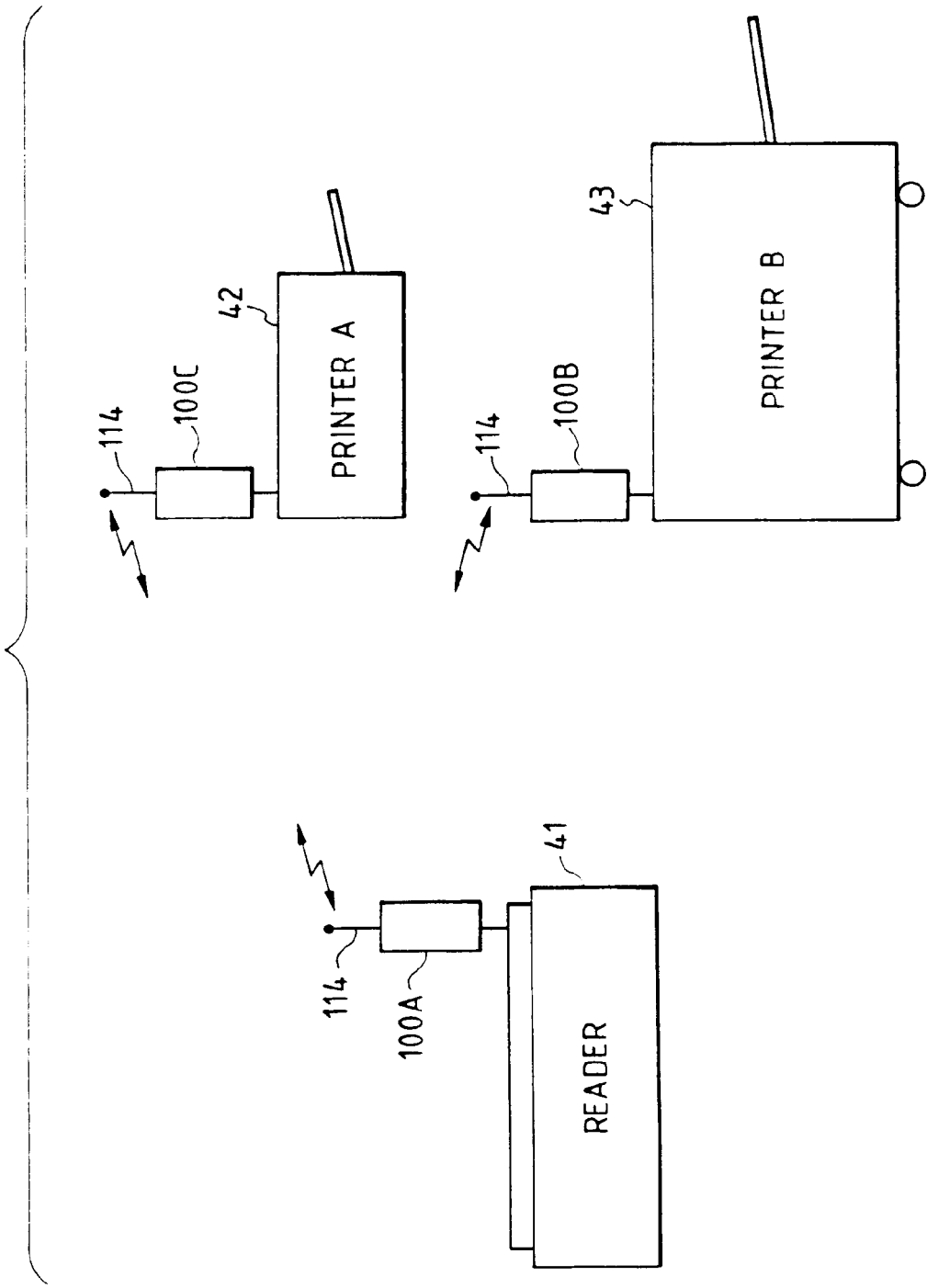
FIG. 16 is a diagram showing a system construction of the seventh embodiment.

FIG. 16 is a diagram showing a constructional example of an image processing apparatus of the seventh embodiment using the communication apparatus according to the invention.

In the diagram, reference numeral 41 denotes a reader to produce image data which was read out from an original and was digitized, and 42 and 43 indicate a printer A and a printer B for printing the supplied image data onto a predetermined recording paper. The printer B (43) is a high speed printer having a printing speed higher than that of the printer A (42).

Reference numerals 100A to 100C denote the communication apparatuses for spread spectrum communication. The communication apparatuses 100A and 100B have two channels of the first and second channels and commonly use the antenna 114. The communication apparatus 100C has one channel as shown in FIG. 15. An internal construction of each of the communication apparatuses 100A and 100B is similar to the construction in which there are two communication channels of the data communication apparatus shown in FIG. 13.

In FIG. 16, in the case where the image data read out by the reader 41 is output to the printer A (42), communication is executed between the first channel of the communication apparatus 100A connected to the reader 41 and the communication apparatus 100C connected to the printer A (42). The diffusion codes for use in only the printer A (42) are automatically set into the diffusion code modulator 105 and the inverse diffuser 120 shown in FIG. 13. In the actual communication, the control signal and the image data are time-divisionally data transferred, thereby obtaining a target image output.

On the other hand, in case of outputting the image data read out by the reader 41 to the printer B (43), the communication is performed between the two channels of the first and second channels of the communication apparatus 100A and the two channels of the first and second channels of the communication apparatus 100B connected to the printer B (43). The diffusion codes for use in only the printer B (43) are automatically set into the diffusion code modulators 105 and 106 and the inverse diffusers 119 and 120 shown in FIG. 13 of the respective channels. For example, the first channel is allocated to the control signal and the second channel is allocated to the image data and the image data is transmitted.

According to the embodiment as mentioned above, since the communication channel is allocated in accordance with the processing speed of the printer A (42) and the processing speed of the printer B (43), the image data process can be executed at a speed according to the processing ability of each apparatus. Particularly, there is an effect such that the ability of the printer B (43) as a high speed printer can be sufficiently effected. A communication apparatus of the eighth embodiment according to the invention will now be described hereinbelow. In the eighth embodiment, the portions having almost the same constructions as those in the first embodiment are designated by the same reference numerals and their detailed descriptions are omitted here.

Figure 17:
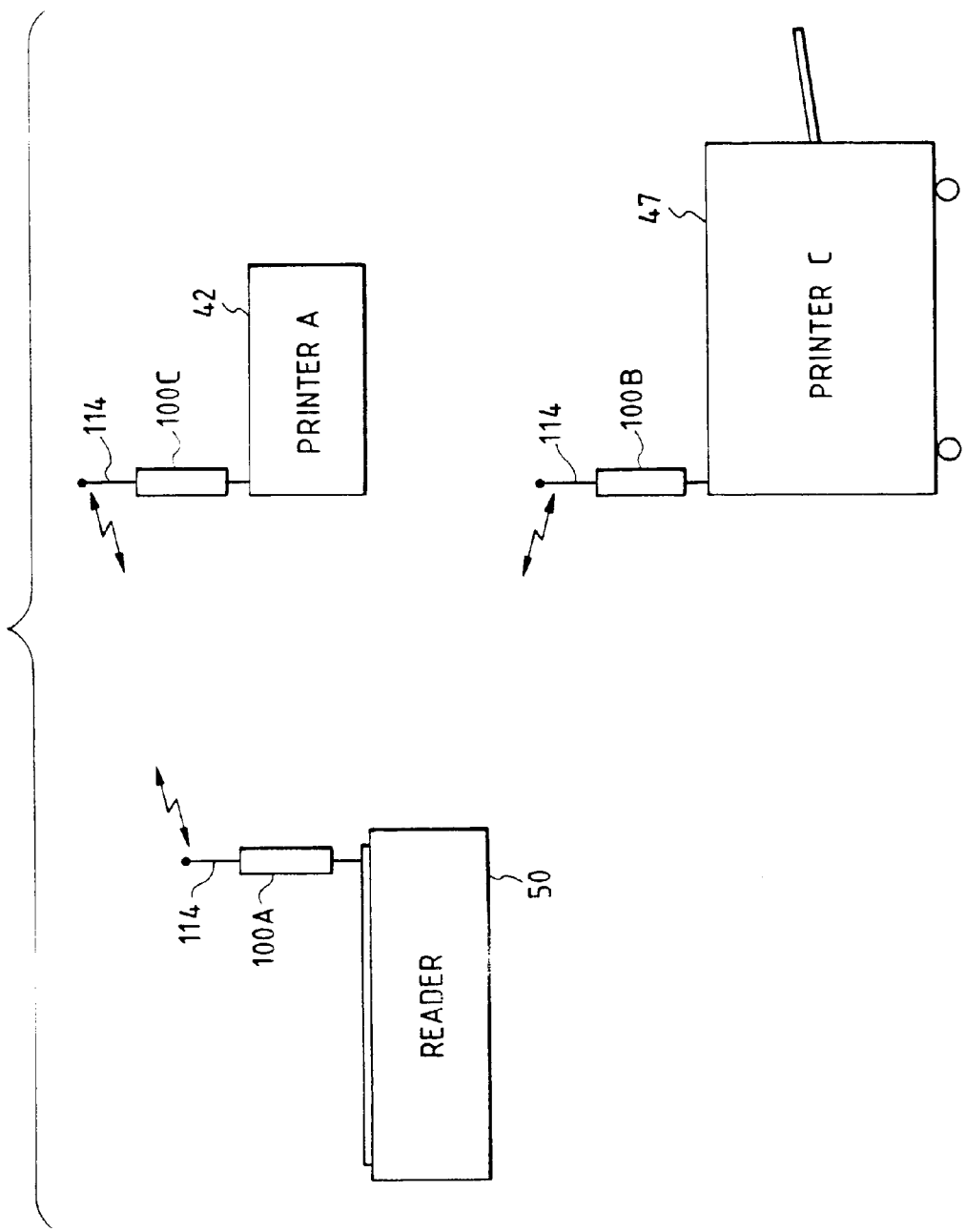
FIG. 17 is a diagram showing a system construction of the eighth embodiment.

FIG. 17 is a diagram showing a constructional example of an image processing apparatus of the eighth embodiment using the communication apparatus according to the invention.

In the diagram, reference numeral 50 denotes a reader which can read image information of an original as multivalue data; 47 a printer C which can print and output the multivalue data; 100A the communication apparatus connected to the reader 50; and 100B the communication apparatus connected to the printer C (47). Each of the communication apparatuses 100A and 100B has five channels of the first to fifth channels in a manner similar to FIG. 1. Reference numeral 42 denotes the printer A which can print and output the binary data. An internal construction of the communication apparatus 100C is substantially the same as that shown in FIG. 15.

In FIG. 17, in case of outputting the image data read out by the reader 50 to the printer A (42), since a construction is almost similar to that in case of the seventh embodiment, its detailed description is omitted here.

On the other hand, in case of outputting the image data read out by the reader 50 to the printer C (47), the communication is performed between the five channels of the first to fifth channels of the communication apparatus 100A connected to the reader 50 and the five channels of the first to fifth channels of the communication apparatus 100B connected to the printer C (47). The diffusion codes for use in only the printer C (47) are set into the diffusion code modulators 105 to 109 and the inverse diffusers 116 to 120 shown in FIG. 1 of the respective channels. For example, the first channel is allocated to the control signal and the second to fifth channels are allocated to the multivalue image data and the image data is transmitted.

According to the embodiment as mentioned above, since the communication channel is allocated in accordance with the processing ability of the printer A (42) or the processing ability of the printer B (43), the image data process can be executed at a speed according to the processing ability of each apparatus. Particularly, there is an effect such that the ability of the printer B (43) to print and output the multivalue data can be sufficiently effected.

In each of the above embodiments, the image processing apparatus comprising the combination of the reader and printer or the combination of the reader, printer, and storage apparatus has been described as an example. However, the invention is not limited to such an example, an image forming apparatus such as CRT monitor, LCD monitor, or the like can be also combined in place of the printer. Or, a processing apparatus such as a personal computer or the like can be also combined in place of the storage apparatus. Further, a reader, a printer, a storage apparatus, a monitor, a personal computer, and the like can be also arbitrarily combined.

The invention can be applied to a system comprising a plurality of apparatuses or can be also applied to an apparatus comprising one equipment.

The invention can be also obviously applied to a case where it is accomplished by supplying a program to a system or an apparatus.

Although the present invention has been described on the basis of the preferred embodiments, the invention is not limited to the foregoing embodiments but many modifications and variations are possible within the spirit and scope of the appended claims of the invention.

What is claimed is:

1. A spread spectrum communication apparatus which has a plurality of communication channels for performing a spread spectrum communication by using a wide-band frequency, and performs a data communication with one communication partner by using at least one communication channel, said apparatus comprising:

determining means for determining a number of communication channels in accordance with a characteristic of the communication partner which receives data from said communication apparatus, wherein the number of communication channels are used for the direct sequence method of the spread spectrum communication;

selecting means for selecting, from among the plurality of communication channels, the communication channel for use as communication, based on the number of communication channels determined by said determining means; and communicating means for transmitting the data to the communication partner through the communication channels selected by said selecting means.

2. An apparatus according to claim 1, wherein said communicating means has dividing means for dividing transmission data in accordance with the number of the communication channels selected by said selecting means.

3. An apparatus according to claim 1, wherein said determining means determines the number of the communication channels in accordance with whether the communication partner is a terminal processing color data or is a terminal processing black and white data.

4. An apparatus according to claim 1, wherein said determining means determines the number of the communication channels in accordance with a processing speed of the communication partner.

5. An apparatus according to claim 1, wherein said determining means determines the number of the communication channels in accordance with whether the communication partner processes binary image data or processes multivalue image data.

6. A spread spectrum communication apparatus which has a plurality of communication channels for performing a spread spectrum communication by using a wide-band frequency, and performs a data communication with one communication partner by using at least one communication channel, said apparatus comprising:

determining means for determining a number of communication channels in accordance with a quantity of communication data which is transmitted to a communication partner, wherein the number of communication channels are used for the direct sequence method of the spread spectrum communication;

selecting means for selecting, from among the plurality of communication channels, the communication channel for use as communication, based on the number of communication channels determined by said determining means; and communicating means for transmitting the communication data through the communication channels selected by said selecting means.

7. A control method of a spread spectrum communication apparatus which has a plurality of communication channels for performing a spread spectrum communication by using a wide-band frequency, and performs a data communication with one communicated partner by using at least one communication channel, comprising the steps of:

determining a number of communication channels in accordance with a characteristic of the communication partner which receives data from said communication apparatus, wherein the number of communication channels are used for the direct sequence method of spread spectrum communication;

selecting, from among the plurality of communication channels, the communication channel for use as communication, based on the number of communication channels determined in said determining step; and transmitting the communication data through the communication channels selected in said selecting step.

8. A control method of a spread spectrum communication apparatus which has a plurality of a communication channels for performing a spread spectrum communication by using a wide-band frequency, and performs a data communication with one communication partner by using at least one communication channel, comprising the steps of:

determining a number of communication channels in accordance with a quantity of communication data which is transmitted to a communication partner, wherein the number of communication channel are used for the direct sequence method of the spread spectrum communication;

selecting, from among the plurality of communication channels, the communication channel for use as communication, based on the number of communication channels determined in said determining step; and transmitting the communication data through the communication channels selected in said selecting step.

9. A spread spectrum communication apparatus comprising:

judging means for judging a characteristic of the communication partner, on the basis of at least an identification information for identifying the communication partner and a data table for storing the characteristic of the communication partner corresponding to said identification information;

selecting means for selecting, from among a plurality of spread codes, the spread codes the number of which corresponds to the characteristic of the communication partner judged by said judging means; and communicating means for communicating with the communication partner by using the spreading code selected by said selecting means.

10. An apparatus according to claim 9, wherein said communicating means comprises dividing means for dividing communication data into the plurality of communication data corresponding to the number of the spreading codes selected by said selecting means.

11. An apparatus according to claim 9, wherein said judging means judges whether the communication partner is a terminal processing color data or a terminal processing black and white data as the characteristic of the communication partner.

12. An apparatus according to claim 9, wherein said judging means judges a processing speed of the communication partner as the characteristic of the communication partner.

13. An apparatus according to claim 9, wherein said judging means judges whether the communication partner processes binary image data or multivalue image data.

14. A spread spectrum communication method comprising:

a judging step of judging a characteristic of the communication partner, on the basis of at least an identification information for identifying the communication partner and a data table for storing the characteristic of the communication partner corresponding to said identification information;

a selecting step for selecting, from among a plurality of spreading codes, the spreading codes the number of which corresponds to the characteristic of the communication partner judged in said judging step; and a communicating steps of communicating with the communication partner by using the spreading code selected in said selecting step.

15. A method according to claim 14, wherein in said communicating step communication data is divided into the plurality of communication data corresponding to the number of the spreading codes selected in said selecting step.

16. A method according to claim 14, wherein it is judged in said judging step whether the communication partner is a terminal processing color data or a terminal processing black and white data as the characteristic of the communication partner.

17. A method according to claim 14, wherein in said judging step a processing a speed of the communication partner is judged as the characteristic of the communication partner.

18. A method according to claim 14, wherein it is judged in said judging step whether the communication partner processes binary image data or multivalue image data as the characteristic of the communication partner.

19. A spread spectrum communication apparatus which communicates a communication data by using at least one spreading code comprising:

determining means for determining a characteristic of communication data; and selecting means for selecting, from among plurality of spreading codes, the spreading codes based on the characteristic of communication data determined by said determining means, wherein the spreading codes are used for spreading the communication data and used for the direct sequence method of the spread spectrum communication.

20. An apparatus according to claim 19, further comprising dividing means for dividing the communication data corresponding to the number of the spreading codes selected by said selecting means.

21. An apparatus according to claim 19, wherein said determining means determines a quantity of the communication data as the characteristic of the communication data.

22. A spread spectrum communication method comprising:

a determining step of determining a characteristic of communication data;

a judging step of judging the number of free spreading codes;

a selecting step of selecting, from among the plurality of spreading codes, the spreading code for use as communication, based on the characteristic of communication data determined in said determining step and the number of the free spreading codes judged in said judging step; and a communicating step of communicating by using the spreading codes selected in said selecting step.

23. A method according to claim 22, wherein in said communicating step the communication data is divided into the plurality of communication data corresponding to the number of the spreading codes selected in said selecting step.

24. A method according to claim 22, wherein in said determining step a quantity of the communication data is determined as the characteristic of the communication data.

25. A spreading spectrum communication apparatus comprising:

spreading means for spreading each of color data divided based on a color factor data having a plurality of color factors by using a different spreading code for the each of color data;

multiplexing means for multiplexing the data being spread respectively by using different spread codes by said spreading means; and transmitting means for transmitting the data multiplexed by said multiplexing means.

26. A spreading spectrum communication method comprising the steps of:

a spreading step of spreading each of color data divided based on a color factor, by using a different spreading code;

a multiplexing step of multiplexing the data being spread respectively by using different spread codes in spreading step; and a transmitting step of transmitting the data multiplexed in said multiplexing step.

27. A spread spectrum communication apparatus comprising:

receiving means for receiving spread data which was divided based on the color factor and was spread respectively by using different spread codes;

de-spreading means for de-spreading the received data respectively by using different spreading codes; and composing means for composing color image data by using the data de-spread by said de-spreading means as a color factor.

28. A spread spectrum communication method comprising the steps of:

a receiving step of receiving spread data which was divided based on the color factor and was spread respectively by using different spread codes;

a de-spreading step of de-spreading the received data respectively by using different spreading codes; and a composing step of composing color image data by using the data de-spread in said de-spreading step as a color factor.

29. A method according to claim 7, wherein said communicating step comprises a dividing step of dividing data in accordance with the number of the communication channels selected in said selecting step.

30. A method according to claim 7, wherein said determining step determines the number of the communication channels, in accordance with whether the communication partner is a terminal processing color data or a terminal processing black and white data.

31. A method according to claim 7, wherein said determining step determines the number of the communication channels, in accordance with a processing speed of the communication partner.

32. A method according to claim 7, wherein said determining step determines the number of the communication channels, in accordance with whether the communication partner processes binary image data or processes multivalue image data.

33. A spread spectrum communication apparatus which has a plurality of communication channels for performing a spread spectrum communication by using a wide-band frequency, and performs a data communication with one communication partner by using at least one communication channel, said apparatus comprising:

determining means for determining the number of the communication channels for communicating the spread data in accordance with whether the communication partner is a terminal processing color data or a terminal processing black and white data;

selecting means for selecting, from among a plurality of communication channels, the communication channels the number of which is determined by said determining means; and communicating means for communicating with the communication partner through the communication channels selected by said selecting means.

34. A spread spectrum communication apparatus which has a plurality of communication channels for performing a spread spectrum communication by using a wide-band frequency, and performs a data communication with one communication partner by using at least one communication channel, said apparatus comprising:

determining means for determining the number of the communication channels for communicating the spread data in accordance with whether the communication partner processes binary image data or multivalue image data;

selecting means for selecting, from among the plurality of communication channels, the communication channels the number of which is determined by said determining means; and communicating means for communicating with the communication partner through the communication channels selected by said selecting means.

35. A control method of a spread spectrum communication apparatus which has a plurality of communication channels for performing a spread spectrum communication by using a wide-band frequency, and performs a data communication with one communication partner by using at least one communication channel, said method comprising:

a determining step of determining the number of the communication channels for communicating the spread data in accordance with whether the communication partner is a terminal processing color data or a terminal processing black and white data;

a selecting step of selecting, from among the plurality of communication channels, the communication channels the number of which is determined in said determining step; and a communicating step of communicating with the communication partner through the communication channels selected in said selecting step.

36. A control method of a spread spectrum communication apparatus which has a plurality of communication channels for performing a spread spectrum communication by using a wide-band frequency, and performs a data communication with one communication partner by using at least one communication channel, said method comprising:

a determining step of determining the number of the communication channels for communicating the spread data in accordance with whether the communication partner processes binary image data or multivalue image data;

a selecting step of selecting, from among the plurality of communication channels, the communication channels the number of which is determined in said determining step; and a communicating step of communicating with the communication partner through the communication channels selected in said selecting step.

* * * * *